Patented Nov. 7, 1922.

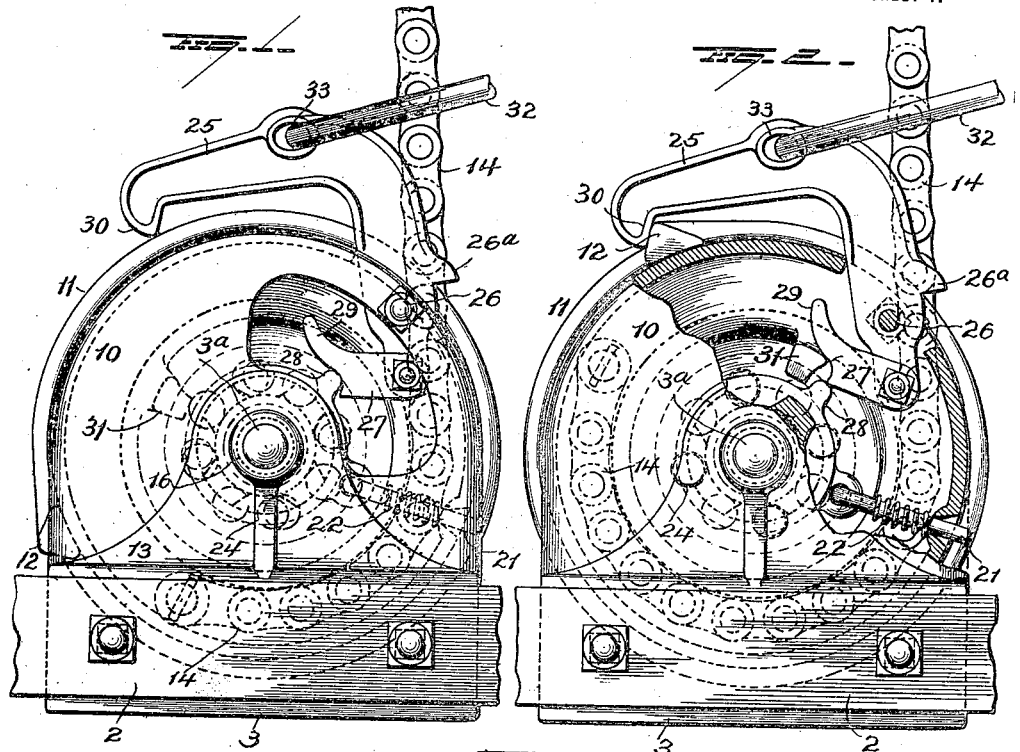
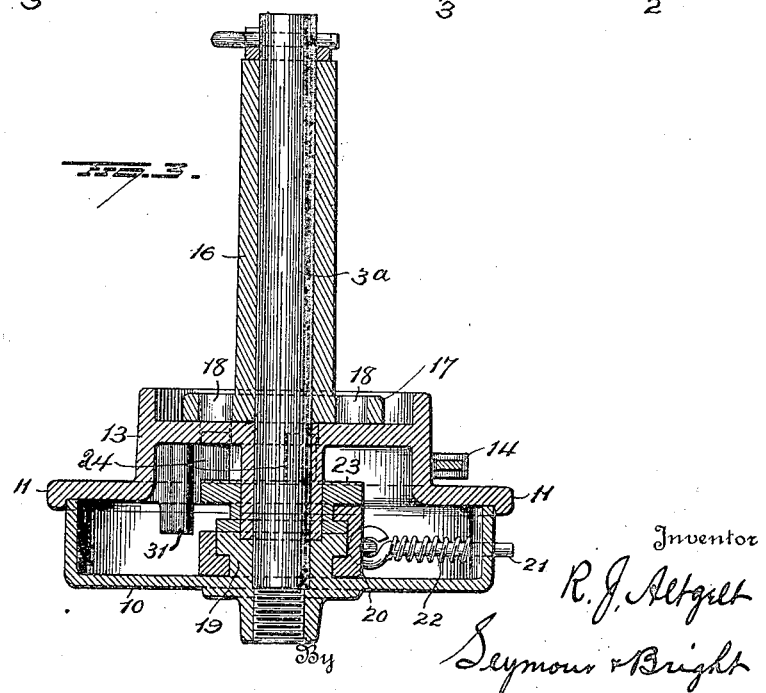

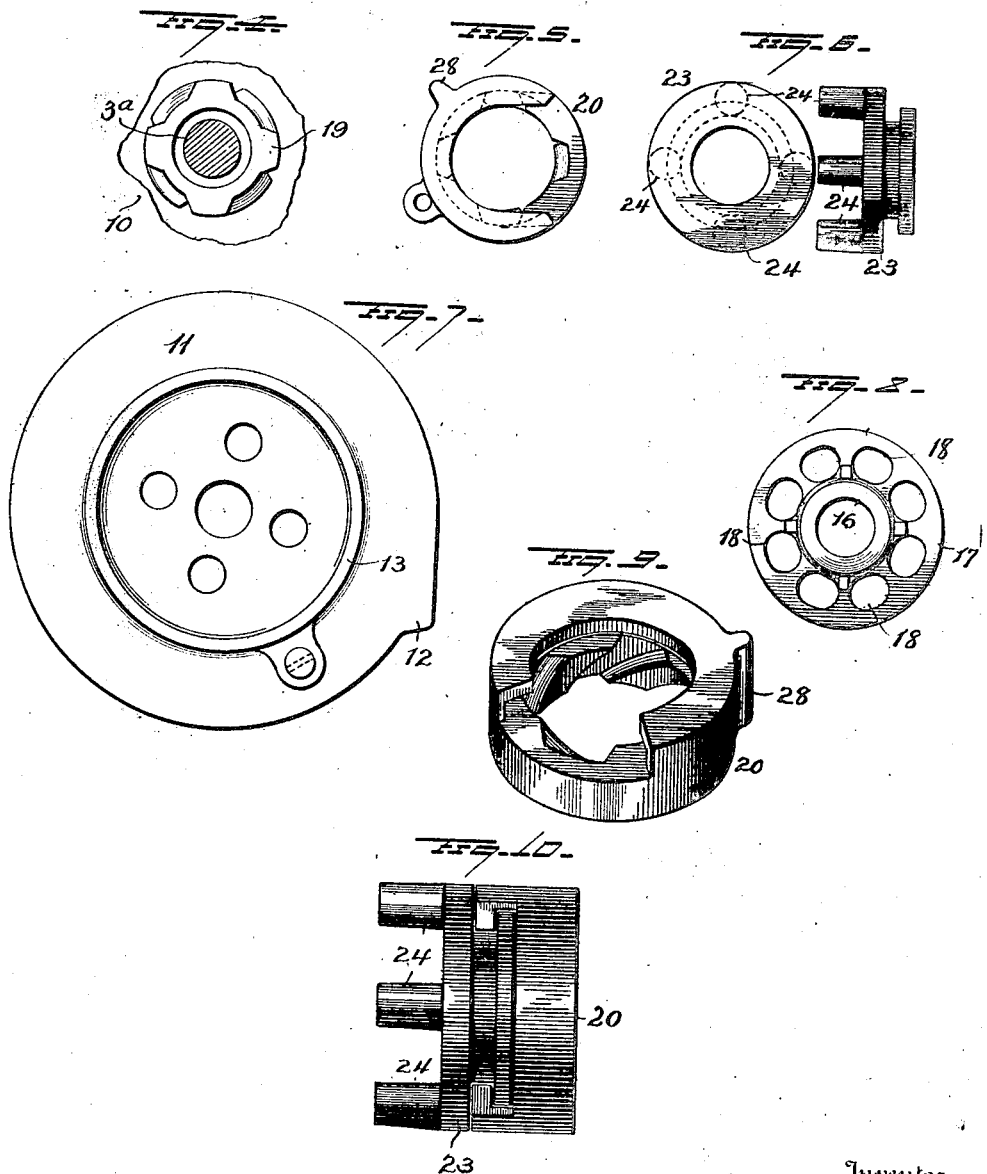

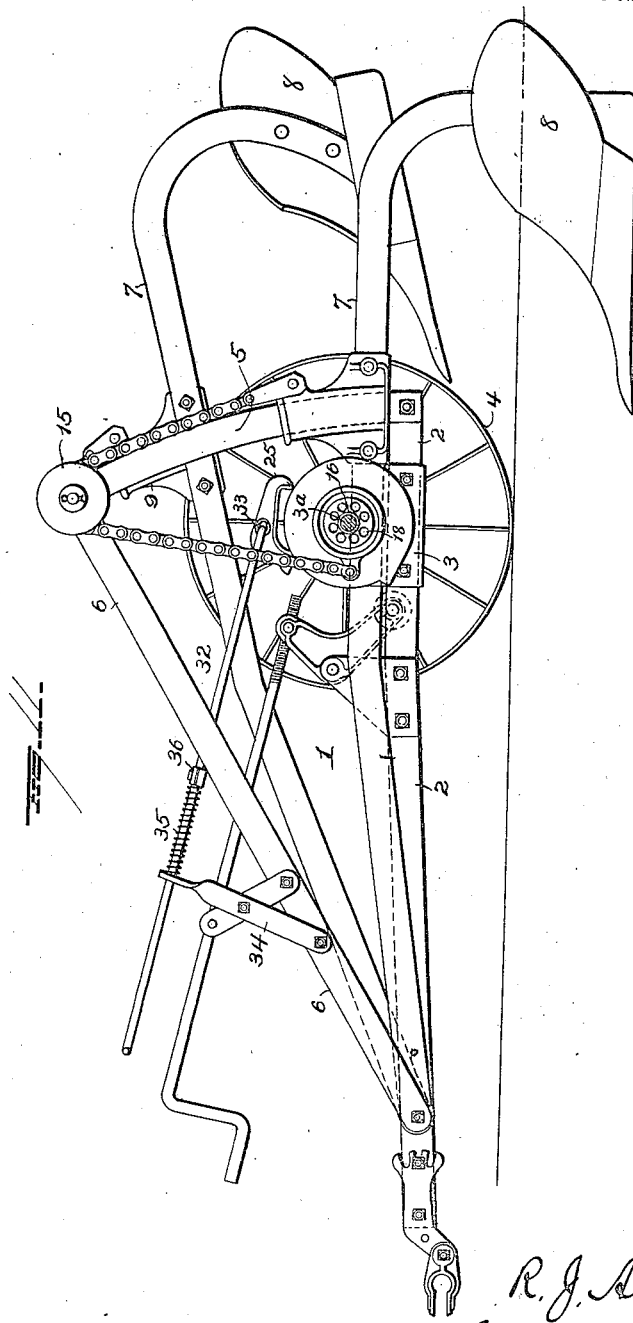

1,434,978

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

WHEEL-OPERATED POWER-LIFT MECHANISM.

Application filed June 11, 1920. Serial No. 388,183.

*To all whom it may concern:*

Be it known that I, RUDOLPH J. ALTGELT, a citizen of the United States, and a resident of South Bend, in the county of St. Joseph and State of Indiana, have invented certain new and useful Improvements in Wheel-Operated Power-Lift Mechanism; and I do hereby declare the following to be a full, clear, and exact description of the invention, such as will enable others skilled in the art to which it appertains to make and use the same.

This invention relates to improvement in wheel-operated power lift mechanism for agricultural implements and more particularly to the clutch mechanism for connecting the lifting means with and disconnecting the same from a ground wheel,—one object of the invention being to provide simple and efficient means operatively connecting raising means for the earth working member of an agricultural implement, such as a plow for example, with and disengaging the same from a ground wheel from which said raising means derives its power.

A further object is to construct the clutch mechanism in such manner that when the raising means are thrown into locked engagement with the ground wheel, the part to be raised (a plow beam for example) will be caused to rise and so that when the latter shall have reached the limit of its upward movement, the clutch mechanism will be operated automatically to release the raising means from the ground wheel and also to lock the raised part, such as the plow beam, in elevated position.

With these and other objects in view, the invention consists in certain novel features of construction and combinations of parts as hereinafter set forth and pointed out in the claims.

In the accompanying drawings; Figure 1 is a view in elevation showing the positions of the parts of the clutch mechanism when the plow or other part to be raised, is in working position; Figure 2 is a similar view (partly in section) showing the positions of the parts when the plow is locked in raised position; Figure 3 is a sectional view of the mechanism shown in Figures 1 and 2; Figures 4 to 10 are views of details of the clutch mechanism, and Figure 11 is a view, in side elevation, of a plow structure, showing an application of my improvements.

In the drawings, I have shown my improvements as the same may be employed with a two-way plow such as shown and described in my Patent No. 1,377,047, issued May 3, 1921.

1 represents a frame, to each side member 2 of which, a bracket 3 is secured for the accommodation of a fixed straight axle member 3ª for a ground wheel 4. The wheeled frame also comprises curved standards, such as indicated at 5 and the upper portions of these are connected with the forward portion of the frame by braces, such as indicated at 6. Plow beams 7 are pivotally connected at their forward ends with the forward portion of the frame and the plow bases 8 carried by these beams are shown disposed reversely with respect to each other as is customary with two-way plows. Each plow beam has secured thereto a tubular guide 9 which is movable on the adjacent curved standard 5.

It will be understood that when my improvements are employed with a two-way plow, the mechanism for controlling the raising and lowering of one of the beams will be duplicated for the other beam. A specific description of one of such mechanisms will suffice for the purposes of this case.

Bracket 3 serves not only to support an axle member 3ª, but also provides a housing 10 for clutch mechanism. Housing 10 is closed by a revoluble disk 11 provided on its peripheral portion with a beveled lug 12, and said disk is also provided with a drum 13, to which one end of a chain 14 is secured and on which said chain is adapted to wind. The chain 14 extends upwardly from the drum 13 and after passing over a pulley 15 at the upper end of the standard 5 is connected with the guide 9 on the plow beam.

Each wheel is provided with an axle box 16 mounted freely on an axle member 3ª and is provided at its inner end with an annular flange 17 having holes 18. A threaded hub 19 is made rigid with the housing and an internally threaded ring 20 is adapted to screw on the threaded hub so that, by the cam cooperating action of threads in the ring 20 and on the hub 19 when the ring is turned, the latter will be caused to move in a direction parallel with its axis. A rod 21 is pivotally connected with the ring 20 and passes freely through a hole in the peripheral wall of the housing. A spring 22 encircling the rod 21, has bearings at its respective ends so that when the ring 20 is turned, it will be retained, by the action of said spring, in the position to which it may be moved. The ring 20 is loosely connected with a ring 23 and the latter is provided with pins 24 which pass through holes in the web of the drum 13 and are adapted to enter the holes 18 in the flange 17 to lock the hub box and wheel to the drum 13 and disk 11 and cause the drum to wind the chain 14 thereon and effect the lifting of the plow beam with which it is connected.

The peripheral wall of the housing 10 is notched for the accommodation of a control lever 25 which is pivotally connected with said housing at 26 and may be provided with a stop lug 26ª to limit the throw of said lever in one direction. The arm of this lever which enters the housing has pivoted thereto, a dog 27 to engage a projection 28 on the ring 20 and said dog is provided with a curved tongue 29 for a purpose presently explained. The free outer end of the control lever 25 is provided with a tooth 30 which, under certain conditions, engages the lug 12 on the peripheral portion of the disk 11. A lug 31 projects from the inner face of the disk to engage the tongue 29 of dog 27 and raise the latter out of operative relation to the projection 28 of ring 20. A manually operable rod 32 is connected at 33 with the control lever 25. A bracket 34 is secured to the frame and perforated for the passage of the operating rod 32. A spring 35 is located on the rod 32 and bears at respective ends against the bracket 34 and an abutment 36 on said rod 32, so as to retain the toothed end of the control lever in and return the same to normal position with relation to the disk 11.

When a plow beam and its base are in working position, with the lug 12 on the disk 11 in the position shown in Figures 1 and 11 and it is desired to raise said beam and its base, the operator will pull the operating rod 32 and cause the corresponding control lever 25 to turn on its pivotal connection with the housing. When the control lever is thus operated, the dog 27 will cooperate with the projection 28 on the ring 20 to turn the latter. The cooperation of the threaded interior of the ring 20 with the threaded hub 19 will cause longitudinal movement of said ring and also the ring 23 and the pins 24 will be projected to enter the holes in the flange 17 of the hub box 16, thus locking the ground wheel to the disk 11 and its drum 13. Forward movement of the plow will now cause the disk and drum to turn with the ground wheel, and the chain 14 will be wound on the drum to raise the plow beam and its base. As the plow beam approaches the limit of its upward movement, the disk 11 will have turned sufficiently to bring the lug 31 into engagement with the projection 28 of the ring 20. Continued movement of the disk 11 will cause the cooperation of the lug 31 with the projection 28 to turn the ring 20 and cause withdrawal of the pins 24 from the perforated flange of the hub box, thus releasing the ground wheel and permitting the same to turn freely. As the disk 11 completes its movement, the lug 31 will engage the curved tongue 29 of the dog 27 and cause the latter to be raised out of cooperative relation to the projection 28 of ring 20, and the peripheral lug 12 on said disk to ride past and be engaged by the tooth 30 of the control lever 25 and the plow beam will be locked in its raised position, the parts then being in the positions shown in Figure 2.

To permit the raised plow beam to drop to working position, the operator will raise the control lever and cause the release of the disk 11 by movement of the tooth 30 out of engagement with the lug 12. The plow beam is now free to drop and assume its working position, the disk 11 being turned by the chain until it assumes the position shown in Figure 1.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In mechanism of the character described, the combination with a driving member, of a fixed housing member, a ring having a screw connection with said housing member, a loose disk, a locking member connected with said ring for locking the disk to the driving member, a control lever mounted on said housing member, a dog attached to said control lever and cooperable with said ring for turning the same to effect locking connection of said disk and driving member, a lug on the disk, and a tooth on the control lever to engage said lug and lock the disk.

2. In mechanism of the character described, the combination with a driving member, of a fixed housing member, a ring having a screw connection with said housing member, a loose disk, a locking member connected with said ring for locking the disk to the driving member, a drum on said disk, a control lever mounted on said housing member, a dog attached to said control lever and cooperable with said ring for turning the same to effect locking connection of said disk and driving member, said dog having a tongue, a lug on the disk to engage said tongue and lift the dog, a lug on the periphery of the disk, and a tooth on the control lever to engage said last-mentioned lug and lock the disk when the drum has been moved a certain distance.

In testimony whereof, I have signed this specification in the presence of two subscribing witnesses.

RUDOLPH J. ALTGELT.

Witnesses:
T. C. CLINTON,
M. E. CULVER.